(12) United States Patent
Barbera

(10) Patent No.: US 10,823,050 B1
(45) Date of Patent: Nov. 3, 2020

(54) SNAP-FIT ENGINE COVER ASSEMBLY

(71) Applicant: Jonathan L. Barbera, Grants Pass, OR (US)

(72) Inventor: Jonathan L. Barbera, Grants Pass, OR (US)

(*) Notice: Subject to any disclaimer, the term of this patent is extended or adjusted under 35 U.S.C. 154(b) by 537 days.

(21) Appl. No.: 15/671,281

(22) Filed: Aug. 8, 2017

Related U.S. Application Data

(60) Provisional application No. 62/375,041, filed on Aug. 15, 2016.

(51) Int. Cl.
  *F02B 77/04* (2006.01)
  *F02B 77/02* (2006.01)
  *F02B 77/08* (2006.01)

(52) U.S. Cl.
  CPC ............. *F02B 77/02* (2013.01); *F02B 77/04* (2013.01); *F02B 77/083* (2013.01)

(58) Field of Classification Search
  CPC ............. F02F 2007/0075; F02B 77/02; F16H 57/031; B65D 5/003
  USPC .................................................... 123/198 E
  See application file for complete search history.

(56) References Cited

U.S. PATENT DOCUMENTS

| | | | |
|---|---|---|---|
| 4,261,310 A * | 4/1981 | Laws, Jr. ................. | F02B 75/22 123/198 E |
| 4,898,758 A | 2/1990 | Lipson | |
| 5,295,602 A * | 3/1994 | Swanson ............ | F02M 35/0203 220/786 |
| 5,421,511 A * | 6/1995 | Aure ...................... | B65D 5/003 229/122.29 |
| 5,567,239 A | 10/1996 | Rubic, Jr. | |
| 6,263,844 B1 * | 7/2001 | Ozeki ....................... | F01L 1/02 123/196 M |
| 6,572,704 B2 | 6/2003 | Keller | |
| 6,589,605 B2 | 7/2003 | Shepley et al. | |
| 6,892,496 B1 * | 5/2005 | Youngs .................. | B60J 5/0416 49/502 |
| 7,022,188 B2 | 4/2006 | Ganci | |
| 7,631,630 B2 | 12/2009 | Sedlar et al. | |
| 7,874,262 B2 | 1/2011 | Bohnheio et al. | |
| 8,173,218 B2 | 5/2012 | Mase et al. | |
| 8,500,907 B2 | 4/2013 | Bohnheio et al. | |
| 8,833,336 B2 * | 9/2014 | Ernst ....................... | F02F 7/006 123/198 E |

(Continued)

*Primary Examiner* — Long T Tran
*Assistant Examiner* — James J Kim
(74) *Attorney, Agent, or Firm* — Jerry Haynes Law

(57) ABSTRACT

A snap-fit engine cover assembly provides multiple customized panels that cover and protect critical engine components which are revealed upon removal of engine component covers. Removing the covers from the engine block may be necessary for repairs, rebuilding, and storage of the engine block. The panels are shaped and dimensioned to substantially match the contour of the formed openings and crevices. The edges of the panels are sufficiently resilient and have recessed grooves that form a snap-fit relationship with the perimeter of the engine component openings. In addition to the snap-fit mating, the panels have fastener apertures that align with engine block apertures; thereby enabling fasteners to pass through for reinforcing the attachment of the panels over the formed openings in the engine block. A cardboard rectangular panel is also used along the sidewall of the engine block to protect against paint when painting portions of the engine block.

19 Claims, 8 Drawing Sheets

(56) References Cited

U.S. PATENT DOCUMENTS

| | | | |
|---|---|---|---|
| 2004/0104074 A1* | 6/2004 | Nakai | F01M 11/02 184/6.5 |
| 2005/0061280 A1* | 3/2005 | Jialanella | C08G 59/66 123/90.38 |
| 2005/0252481 A1* | 11/2005 | Garner | F02F 7/00 123/198 E |
| 2006/0070599 A1* | 4/2006 | Nonogaki | F02M 35/10137 123/195 C |
| 2014/0263304 A1* | 9/2014 | Guertin | B65D 25/16 220/4.28 |
| 2016/0054123 A1* | 2/2016 | Zhao | G01C 9/06 33/366.13 |
| 2017/0045131 A1* | 2/2017 | Yolitz | F16H 55/56 |
| 2018/0086406 A1* | 3/2018 | Janyapanich | B60K 11/06 |
| 2020/0191431 A1* | 6/2020 | Bhongade | F16K 31/055 |

* cited by examiner

SNAP-FIT ENGINE COVER ASSEMBLY

CROSS-REFERENCE TO RELATED APPLICATIONS

This application claims priority from U.S. Provisional Application Ser. No. 62/375,041, entitled "Snap-Fit Engine Cover Assembly", filed on Aug. 15, 2016, which application is hereby incorporated herein by reference in its entirety.

FIELD OF THE INVENTION

The present invention relates generally to engine cover assemblies. More so, the present invention relates to a set of snap-fit customized panels that cover and protect critical engine components from foreign materials falling into the engine interior during repairs, rebuilding, and storage of the engine block.

BACKGROUND OF THE INVENTION

It is known that removing the engine component covers from the engine block may be necessary for repairs, rebuilding, and storage of the engine blocks. The problem arises when mechanics are working on or around these critical component openings. Foreign objects such as small bolts, screws, washers, clamps, very small hand tools, dust and dirt, insects, small animals, liquid and debris built-up on or around the engine can inadvertently enter said openings. This situation can create a major problem which would require huge time and effort to remove these objects or even extensive engine disassembly could be required. If these objects were unknowingly left in the openings, this situation can adversely alter the operation of component and/or components or cause severe damage to the engine during operation. Thus covering the engine components will prevent foreign objects from entering inside the engine and also prevents damage to machined engine component opening surfaces.

Numerous innovations have been provided in the prior art that are adapted to engine covers. Even though these innovations may be suitable for the specific purposes to which they address, they would not, however, be as suitable for the purposes of the present invention.

For example, U.S. Pat. No. 4,898,758 to Lipson discloses a paint mask for a three-dimensional insignia plate upon a vehicle body to protect the insignia plate or other part from paint or other material sprayed on a body adjacent the molded insignia plate.

U.S. Pat. No. 5,567,239 to Rubic, Jr. describes a paint mask for use in painting the transitional area between motor vehicle windshields embedded in profile members or gaskets and the motor vehicle body. The masking profile is constructed with two profile legs at an angle relative to one another and with an adhesive coating on at least one profile leg.

U.S. Pat. No. 6,572,704 to Keller teaches an apparatus comprising a plurality of inflatable hollow body members for protecting the walls of a row of cylinders of an engine block from contamination when the walls of the other row of cylinders of the engine block are thermally coated.

U.S. Pat. No. 6,589,605 to Shepley et al. discloses a masking for an engine block to be thermally sprayed with a coating that includes a head deck mask portion and a crankcase mask portion adapted to engage a head deck and a crankcase chamber of an engine block to prevent overspray of a thermally sprayed coating on the head deck and the crankcase chamber.

U.S. Pat. No. 7,022,188 to Ganci describes a mask for protecting a convex and/or window portion of a vehicle, the mask being made of a sheet material.

U.S. Pat. No. 7,631,630 to Sedlar et al. teaches a cover assembly for snap attachments to a flange of an engine without the use of threaded fasteners and includes a cover, a clip, and an elastomeric dampener.

U.S. Pat. No. 7,874,262 to Bohnheio et al. discloses a masking system for the masking of a crank chamber of an internal combustion engine during a surface treatment of a cylinder of the internal combustion engine.

U.S. Pat. No. 8,173,218 to Mase et al. describes a method of spraying a component. A turbine engine component, such as a case, is disposed near a spray coating device, such as a thermal spray torch. The turbine engine component has a first mating feature formed as part of the turbine engine component. A mask is disposed over a portion of the turbine engine component. The mask has a second mating feature. The mask is connected to the turbine engine component by resiliently connecting the first mating feature to the second mating feature. The turbine engine component is then sprayed.

U.S. Pat. No. 8,500,907 to Bohnheio et al. teaches a masking system for masking a cylinder bore of a combustion engine during a thermal coating procedure including a masking body that is placed during the thermal coating of a first cylinder of the combustion engine in the cylinder bore of a second cylinder to cover a cylinder wall of the second cylinder. The masking body provides a flow gap of predetermined breadth between the masking body and the cylinder wall of the second cylinder for the production of a flow of a fluid.

U.S. Pat. No. 8,833,336 to Ernst discloses an engine cover system that provides temporary reusable covers for engine blocks to protect against entry of foreign material into the engine when the head and manifolds are removed during repair, rebuild or transport both with used and new engine blocks. The head and/or intake manifolds include at least a cam valley cover, and first and second head covers. The covers are adapted for mounting to the engine and can be employed together or separately for use in different situations.

U.S. Patent Application No. 2005/0252481 to Garner describes a component cover for internal combustion engines for covering and protecting critical engine component openings that are revealed upon engine component removal for repairs, rebuild, and/or storage, which will custom fit engine component openings and protect from inadvertent or accidental entry of foreign objects/debris and also protecting machined surfaces from inadvertent or accidental damage.

It is apparent now that numerous innovations for covering engine components have been developed in the prior art that are adequate for various purposes. Furthermore, even though these innovations may be suitable for the specific purposes to which they address, accordingly, they would not be suitable for the purposes of the present invention as heretofore described. Thus a set of snap-fit customized panels that cover and protect critical engine components from foreign materials such as bolts, screws, washers, clamps, very small hand tools, dust and dirt, insects, small animals, liquids and the like falling into the engine interior during repairs, rebuilding, and storage of the engine block is needed.

SUMMARY OF THE INVENTION

The present invention discloses an engine cover assembly comprising a set of snap-fit customized panels that cover and protect critical engine components from foreign materials such as bolts, screws, washers, clamps, very small hand tools, dust and dirt, insects, small animals, liquids and the like falling into the engine interior during repairs, rebuilding, and storage of the engine block. The panels are shaped and dimensioned to substantially match the contour of the formed openings and crevices; whereby the edges of the panels are sufficiently resilient and have recessed grooves that form a snap-fit relationship with the perimeter of the engine component openings; whereby the panels have fastener apertures that align with engine block apertures, thereby enabling fasteners to pass through for reinforcing the attachment of the panels over the formed openings in the engine block.

According to one aspect of the present invention a snap-fit engine cover assembly, the assembly includes a generally elongated first panel configured to substantially match the shape of an opening formed during removal of a valve cover from an engine block, the first panel further configured to enable at least partial covering of the opening formed during removal of the valve cover, the first panel defined by a generally resilient first edge that forms a snap-fit relationship with a valve cover perimeter, the first panel further defined by at least one first fastener aperture configured to align with a valve cover aperture; at least one generally elongated second panel configured to substantially match the shape of an opening formed during removal of at least one piston cover from the engine block, the at least one second panel further configured to enable at least partial covering of the opening formed during removal of the at least one piston cover, the at least one second panel defined by a generally resilient second edge that forms a snap-fit relationship with a piston cover perimeter, the second panel further defined by at least one second fastener aperture configured to align with a piston cover aperture; a first oval panel configured to substantially match the shape of an opening formed during removal of a timing chain cover from the engine block, the first oval panel further configured to enable at least partial covering of the opening formed during removal of the timing chain cover, the first oval panel defined by a generally resilient first oval edge that forms a snap-fit relationship with a timing chain cover perimeter, the first oval panel further defined by at least one third fastener aperture configured to align with a timing chain cover aperture, the first oval panel further defined by a component opening; a plurality of second oval panels configured to substantially match the shape of an opening formed during removal of a plurality of exhaust valve port covers from the engine block, the plurality of second oval panels further configured to enable at least partial covering of the opening formed during removal of the plurality of exhaust valve port covers, the plurality of second oval panels defined by a generally resilient second oval edge that forms a snap-fit relationship with an exhaust valve port cover perimeter, the plurality of second oval panels further defined by at least one fourth fastener aperture configured to align with an exhaust valve port cover aperture; a generally circular panel configured to substantially match the shape of an opening formed during removal of an oil filter from the engine block, the circular panel further configured to enable at least partial covering of the opening formed during removal of the oil filter, the circular panel defined by a generally resilient circular edge that forms a snap-fit relationship with an oil filter perimeter, the circular panel further defined by at least one fifth fastener aperture configured to align with an oil filter aperture; a generally curved panel configured to substantially match the shape of an opening formed during removal of an oil pan from the engine block, the curved panel further configured to enable at least partial covering of the opening formed during removal of the oil pan, the curved panel defined by a generally resilient curved edge that forms a snap-fit relationship with an oil pan perimeter, the curved panel further defined by at least one sixth fastener aperture configured to align with an oil pan cover aperture; and a generally rectangular panel configured to enable at least partial covering of a sidewall of the engine block, the rectangular panel defined by at least one seventh fastener aperture configured to align with a sidewall aperture.

In view of the foregoing, it is therefore an object of the present invention is to provide an assembly having multiple lightweight panels that are adapted to cover various openings of an engine block when engine components are removed from the engine bock.

Another objective is to provide one or more panels that are customized to form an exact fit over the formed openings or crevices of the engine.

Another objective is to provide snap-fit engine cover assemblies comprising a set of snap-fit flexible customized panels that cover and protect critical engine components from foreign materials are fabricated from a lightweight polymer.

Another objective is to provide snap-fit flexible customized panels which have resilient edges comprising recessed grooves that interlock with the respective perimeter of the engine block for easy and quick attachment and removal of the panels.

Another objective is to provide a panel that can be assembled and removed from the engine block without using tools.

Another objective is to provide fastener apertures in the panels that enable a fastener to provide additional fastening securement to the panels over the formed openings.

Another objective is to provide an inexpensive method to manufacture engine cover assemblies.

Another objective is to provide a snap-fit engine cover assembly comprising a set of snap-fit flexible customized panels that cover and protect at least a valve opening, a piston opening, a timing chain chamber opening, water pump jacket opening, oil filter chamber opening, oil pan opening, exhaust valve ports and a rectangular panel that acts as a paint mask to protect sidewalls of the engine block.

Other objectives and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
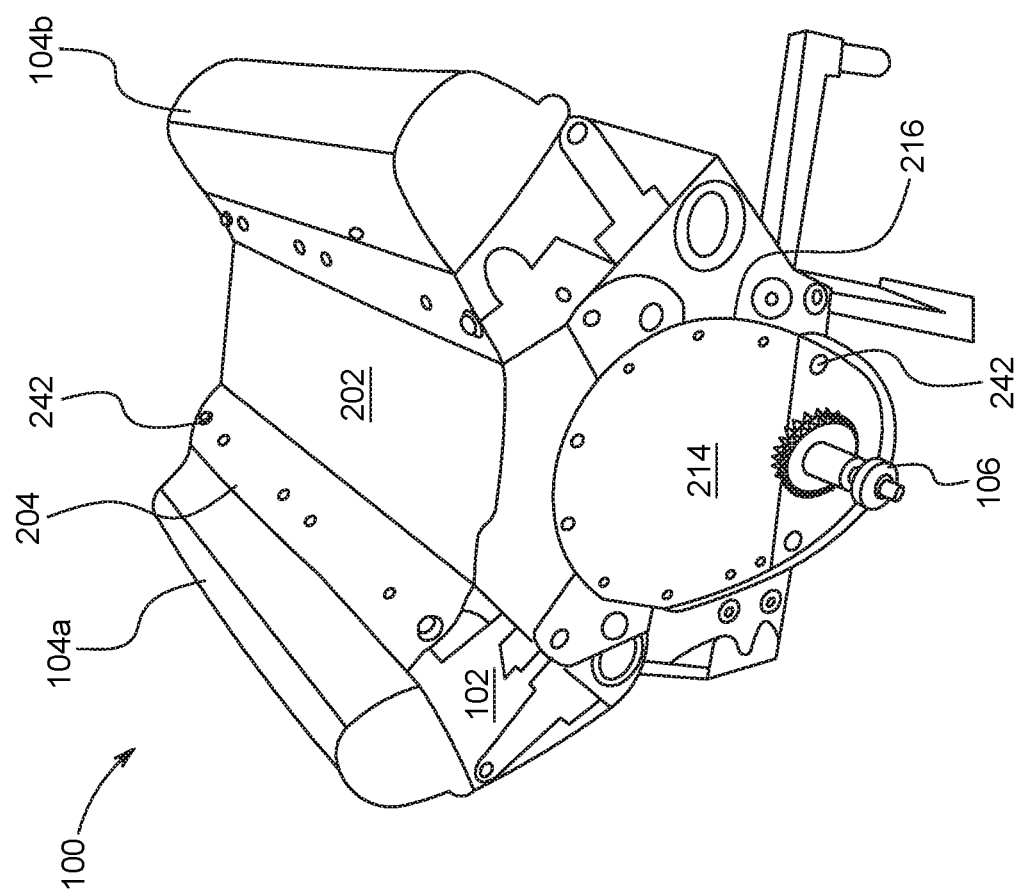
FIG. 1 illustrates a perspective view of an exemplary engine block, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1-8. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

A snap-fit engine cover assembly 200 is referenced in FIGS. 1-8. The assembly 200 provides a plurality of panels 202, 208a, 208b, 214, 220a-f, 226, 232 that cover and protect critical engine component openings and crevices that are revealed upon removal of engine component for repairs, rebuild, and storage of the engine. The panels 202, 208a, 208b, 214, 220a-f, 226, 232 are configured to substantially match the contour of different openings and crevices of the engine that form when the engine components are removed from an engine block 100.

The panels 202, 208a, 208b, 214, 220a-f, 226, 232 have resilient edges 204, 210a, 210b, 216, 222a-f, 228, 234 that create a snap-fit relationship with the perimeters of the openings and crevices to fasten each panel 202, 208a, 208b, 214, 220a-f, 226, 232 over a respective opening, while also sealing the perimeter of the engine component against fluid leaks. The snap-fit relationship expedites the attachment and removal of the panels 202, 208a, 208b, 214, 220a-f, 226, 232 over the corresponding holes or crevices. Additionally, the panels 202, 208a, 208b, 214, 220a-f, 226, 232 have apertures 206, 212a, 212b, 218, 224a-f, 230, 236, 240a-d that align with corresponding apertures in the engine block 100. In this manner, at least one fastener 242 passing through the aligned apertures 206, 212a, 212b, 218, 224a-f, 230, 236, 240a-d can secure the panel over the appropriate opening or crevice. This reinforces the snap-fit fastening mechanism.

The assembly 200 has variously shaped and dimensioned panels 202, 208a, 208b, 214, 220a-f, 226, 232 that cover the openings and crevices of the engine block 100 that form when various engine components are removed. The removed engine components may include, without limitation, a head, a valve, a timing chain, a water pump jacket, a piston, an oil filter, an oil pan, a carburetor, and any sidewall 102 of the engine block 100. The panels 202, 208a, 208b, 214, 220a-f, 226, 232 are shaped to substantially match the contour of the hole or crevice that is formed when the engine component is removed.

For example, an elongated first panel 202 covers an opening in a top region of the engine block 100 that forms when the valve cover is removed to access the valves. An elongated second panel 208a, 208b covers a V-shaped crevice in the top region of the engine block 100 that forms when the heads are removed. A first oval panel 214 covers a hole in the side region of the engine block 100 that forms when a timing chain cover is removed to access the timing chain or water pump jacket.

The panels 202, 208a, 208b, 214, 220a-f, 226, 232 are substantially fabricated from a resilient polymer so as to be sufficiently flexible. This flexibility enables the edges 204, 210a, 210b, 216, 222a-f, 228, 234 of the panels 202, 208a, 208b, 214, 220a-f, 226, 232 to create a snap-fit fastening mechanism with the perimeter of the engine at the removed component cover. The edges 204, 210a, 210b, 216, 222a-f, 228, 234 may include a recessed groove that interlocks with the perimeter of the opening.

In operation of the snap-fit mechanism, the edges 204, 210a, 210b, 216, 222a-f, 228, 234 of the panels 202, 208a, 208b, 214, 220a-f, 226, 232 are pushed into the perimeter of the engine component openings to form an interlocking relationship there between. Those skilled in the art will recognize that there are a number of variations of snap-fit mechanisms, including cantilever, torsional and annular. In any case, the snap-fit mechanism of the panels 202, 208a, 208b, 214, 220a-f, 226, 232 are configured to provide an alternative to assembly using nails or screws, and have the advantages of speed and no loose parts. Though the assembly also provides a secondary means of fastening the panels 202, 208a, 208b, 214, 220a-f, 226, 232 to the engine block 100 through at least one fastener 242.

The panels 202, 208a, 208b, 214, 220a-f, 226, 232 are customized to engine sections and different types and sizes of engine blocks. The panels 202, 208a, 208b, 214, 220a-f, 226, 232 can be constructed to be scalable, so as to cover different types and sizes of engines openings and crevices. The assembly 200 may be offered with the full complement of panels 202, 208a, 208b, 214, 220a-f, 226, 232, or individual panels. In one alternative embodiment, a cardboard rectangular panel 238 is used to cover sidewalls 102 of the engine block 100, so as to protect against the outer surface of the engine block 100 from being painted during painting operations.

One aspect of a snap-fit engine cover assembly 200, comprises: a first panel 202 configured to enable at least partial covering of an opening formed during removal of a valve cover from an engine block 100, wherein the first panel 202 forms a snap-fit relationship with a valve cover perimeter; at least one second panel 208a, 208b configured to enable at least partial covering of the opening formed during removal of the at least one piston cover 104a, 104b from the engine block 100, wherein the at least one second panel 208a, 208b forms a snap-fit relationship with a piston cover perimeter 108; a third panel 214 configured to enable at least partial covering of the opening formed during removal of the timing chain cover the engine block 100, wherein the third panel 214 forms a snap-fit relationship with a timing chain cover perimeter; a plurality of fourth panels 220a-f configured to enable at least partial covering of the opening formed during removal of the plurality of exhaust valve port covers the engine block 100, wherein each of the plurality of fourth panels forms a snap-fit relationship with an exhaust valve port cover perimeter; a fifth panel 226 configured to enable at least partial covering of the opening formed during removal of the oil filter the engine block 100, wherein the fifth panel forms a snap-fit relationship with an oil filter perimeter; a sixth panel 232 configured to enable at least partial covering of the opening formed during removal of the oil pan the engine block 100, wherein the sixth panel 232 forms a snap-fit relationship with an oil pan perimeter; and a seventh panel 238 configured to enable at least partial covering of a sidewall 102 of the engine block 100, wherein the seventh panel 238 forms a snap-fit alignment with the sidewall 102 of the engine block 100.

In another aspect, the first panel 202 is a substantially elongated panel configured to substantially match the shape of the opening formed during removal of the valve cover from the engine block 100.

In another aspect, the at least one second panel 208a, 208b is a substantially elongated panel configured to substantially match the shape of the opening formed during removal of the at least one piston cover from the engine block 100.

In another aspect, the third panel 214 is a substantially oval panel configured to substantially match the shape of the opening formed during removal of the timing chain cover from the engine block 100.

In another aspect, the plurality of fourth panels 220a-f are substantially oval panels configured to substantially match the shape of the openings formed during removal of the plurality of exhaust valve port covers from the engine block 100.

In another aspect, the fifth panel 226 is a substantially circular panel configured to substantially match the shape of the opening formed during removal of the oil filter from the engine block 100.

In another aspect, the sixth panel 232 is a curved panel configured to substantially match the shape of the opening formed during removal of the oil pan from the engine block 100.

In another aspect, the seventh panel 238 is a substantially rectangular panel constructed from cardboard.

In another aspect, the first panel 202, the at least one second panel, the third panel, the plurality of fourth panels, the fifth panel, and the sixth panel are fabricated from a lightweight polymer.

In another aspect, the first panel 202, the at least one second panel 208a, 208b, the third panel 214, the plurality of fourth panels 220a-f, the fifth panel 226, the sixth panel 232 and the seventh panel 238 have resilient edges 204, 210a, 210b, 216, 222a-f, 228, 234 respectively with recessed groove that interlocks with the respective perimeter of the engine block.

In another aspect, the first panel 202, the at least one second panel 208a, 208b, the third panel 214, the plurality of fourth panels 220a-f, the fifth panel 226, the sixth panel 232 and the seventh panel 238 comprises at least one fastener aperture 206, 212a, 212b, 218, 224a-f, 230, 236, 240a-d respectively on the panels, thereby allowing at least one push fit fastener 242 to pass through the fastener apertures 206, 212a, 212b, 218, 224a-f, 230, 236, 240a-d respectively on each of the panels that align with corresponding apertures in the engine block 100.

In another aspect, the third panel 214 has a component opening 244, which is configured to enable passage of a drive axle 106.

In another aspect of a snap-fit engine cover assembly 200, comprises a generally elongated first panel 202 configured to substantially match the shape of an opening formed during removal of a valve cover from an engine block 100, the first panel 202 further configured to enable at least partial covering of the opening formed during removal of the valve cover, the first panel 202 defined by a generally resilient first edge 204 that forms a snap-fit relationship with a valve cover perimeter, the first panel 202 further defined by at least one first fastener aperture 206 configured to align with a valve cover aperture; at least one generally elongated second panel 208a, 208b configured to substantially match the shape of an opening formed during removal of at least one piston cover 104a, 104b from the engine block 100, the at least one second panel 208a, 208b further configured to enable at least partial covering of the opening formed during removal of the at least one piston cover 104a, 104b, the at least one second panel 208a, 208b defined by a generally resilient second edge 210a, 210b that forms a snap-fit relationship with a piston cover perimeter 108, the second panel 208a, 208b further defined by at least one second fastener aperture 212a, 212b configured to align with a piston cover aperture 110; a first oval panel 214 configured to substantially match the shape of an opening formed during removal of a timing chain cover from the engine block 100, the first oval panel 214 further configured to enable at least partial covering of the opening formed during removal of the timing chain cover, the first oval panel 214 defined by a generally resilient first oval edge 216 that forms a snap-fit relationship with a timing chain cover perimeter, the first oval panel 214 further defined by at least one third fastener aperture 218 configured to align with a timing chain cover aperture, the first oval panel 214 further defined by a component opening; a plurality of second oval panels 220a-f configured to substantially match the shape of an opening formed during removal of a plurality of exhaust valve port covers from the engine block 100, the plurality of second oval panels 220a-f further configured to enable at least partial covering of the opening formed during removal of the plurality of exhaust valve port covers, the plurality of second oval panels 220a-f defined by a generally resilient second oval edge 222a-f that forms a snap-fit relationship with an exhaust valve port cover perimeter, the plurality of second oval panels 220a- further defined by at least one fourth fastener aperture 224a-f configured to align with an exhaust valve port cover aperture; a generally circular panel 226 configured to substantially match the shape of an opening formed during removal of an oil filter from the engine block 100, the circular panel 226 further configured to enable at least partial covering of the opening formed during removal of the oil filter, the circular panel 226 defined by a generally resilient circular edge 228 that forms a snap-fit relationship with an oil filter perimeter, the circular panel 226 further defined by at least one fifth fastener aperture 230 configured to align with an oil filter aperture; a generally curved panel 232 configured to substantially match the shape of an opening formed during removal of an oil pan from the engine block 100, the curved panel 232 further configured to enable at least partial covering of the opening formed during removal of the oil pan, the curved panel 232 defined by a generally resilient curved edge 234 that forms a snap-fit relationship with an oil pan perimeter, the curved panel 232 further defined by at least one sixth fastener aperture 236 configured to align with an oil pan cover aperture; and a generally rectangular panel 238 configured to enable at least partial covering of a sidewall 102 of the engine block 100, the rectangular panel 238 defined by at least one seventh fastener aperture 240a-d configured to align with a sidewall aperture.

In another aspect, the first panel 202, the second panel 208a, 208b, the first oval panel 214, the plurality of second oval panels 220a-f, the circular panel 226, and the curved panel 232 are fabricated from a lightweight polymer.

In another aspect, the assembly 200 further includes at least one fastener 242 configured to pass through the fastener apertures 206, 212a, 212b, 218, 224a-f, 230, 236, 240a-d.

In another aspect, the first edge 204, the second edge 210a, 210b, the first oval edge 216, the second oval edge 222a-f, the circular edge 228, and the curved edge 234 have a recessed groove that interlocks with the respective perimeter of the engine block 100.

In another aspect, the rectangular panel 238 is constructed from cardboard.

In another aspect, the rectangular panel 238 is configured to block paint from engaging the sidewall 102 of the engine block 100.

One objective of the present invention is to provide an assembly 200 having multiple lightweight panels that are adapted to cover various openings that form on an engine block 100 when engine components are removed from the engine bock.

Another objective is to provide one or more panels that are customized to form an exact fit over the formed openings or crevice of the engine.

Another objective is to provide resilient edges that form a snap-fit relationship with the openings that form when engine components are removed from the engine block 100.

Another objective is to provide a panel that can be assembled and removed from the engine block 100 without using tools.

Another objective is to provide fastener apertures in the panels that enable a fastener to provide additional fastening securement to the panels over the formed openings.

Another objective is to provide an inexpensive to manufacture engine cover assembly 200.

As referenced in FIG. 1-8, the snap-fit engine cover assembly 200 provides multiple customized panels 202, 208a, 208b, 214, 220a-f, 226, 232 that cover and protect critical engine components that are revealed upon removal of engine component covers. It is known that removing the engine component covers from the engine block 100 may be necessary for repairs, rebuild, and storage of the engine block 100. An additional panel 238 is used as a paint mask for protecting the sidewalls of the engine block 100. The engine block may be any type of engine block, whether short or long or any type of internal combustion engine or the like. The multiple customized panels 202, 208a, 208b, 214, 220a-f, 226, 232 and 238 are available in various shape and design and are configured to match the openings of the engine block 100.

Those skilled in the art will also recognize that the engine block 100 refers to the crankcase and all the components that fill it, including gaskets, valves, and seals. The engine block 100 houses the cylinders and their components inside a cooled and lubricated crankcase. A number of channels and passages inside comprise the cooling jacket and are designed to deliver water from the radiator to all the hot sections of the engine, preventing overheating. The core of the engine block 100 is the cylinders, capped by the cylinder head. Attached to the bottom is the oil pan, which seals in the lubricating oil for the engine.

In one embodiment shown in FIG. 1-8, the panels 202, 208a, 208b, 214, 220a-f, 226, 232 comprise a first panel 202, at least one second panel 208a, 208b, an first oval panel 214, a plurality of second oval panels 220a-f, a circular panel 226, and a curved panel 232. The shape of the panels 202, 208a, 208b, 214, 220a-f, 226, 232 generally correlate to the shape of the cover for the engine component. The panels 202, 208a, 208b, 214, 220a-f, 226, 232 are fabricated from a lightweight polymer, so as to be easily attached, detached, and carried for enhanced portability.

The panels 202, 208a, 208b, 214, 220a-f, 226, 232 are shaped and dimensioned to substantially match the contour of the formed openings and crevices. The edges of the panels 202, 208a, 208b, 214, 220a-f, 226, 232 are sufficiently resilient and have recessed grooves that form a snap-fit relationship with the perimeter of the engine component openings. This expedites attachment and detachment of the panels 202, 208a, 208b, 214, 220a-f, 226, 232.

In addition to the snap-fit mating, the panels 202, 208a, 208b, 214, 220a-f, 226, 232 may also include strategically placed fastener apertures 206, 212a, 212b, 218, 224a-f, 230, 236, 240a-d that align with engine block 100 apertures. In this manner, at least one fastener 242 passes through the apertures 206, 212a, 212b, 218, 224a-f, 230, 236, 240a-d to reinforce the snap-fit attachment of the panels 202, 208a, 208b, 214, 220a-f, 226, 232 over the formed openings in the engine block 100.

Those skilled in the art will recognize that cover assemblies for internal combustion engines are effective for inhibiting entry of moisture, dirt, fluids, or pests from the interior regions of an engine block 100. Typically, the engine cover assembly is made of metal and is clamped by means of metal bolts to the engine block 100. The metal cover assembly does not attenuate noise well or conform to the movement of the engine block 100 relative to the engine cover. Further, metal engine covers may increase the weight of the automotive vehicle. Often, plastic covers are utilized. But they have shortcomings due to material creep strength and difficulties in staying securely fastened to the engine block 100. The disclosed engine cover assembly 200 provides multiple customized panels 202, 208a, 208b, 214, 220a-f, 226, 232 that cover openings in the engine bock and attach to the engine block 100 through a snap-fit mechanism, or a fastener, or both.

Figure 3:
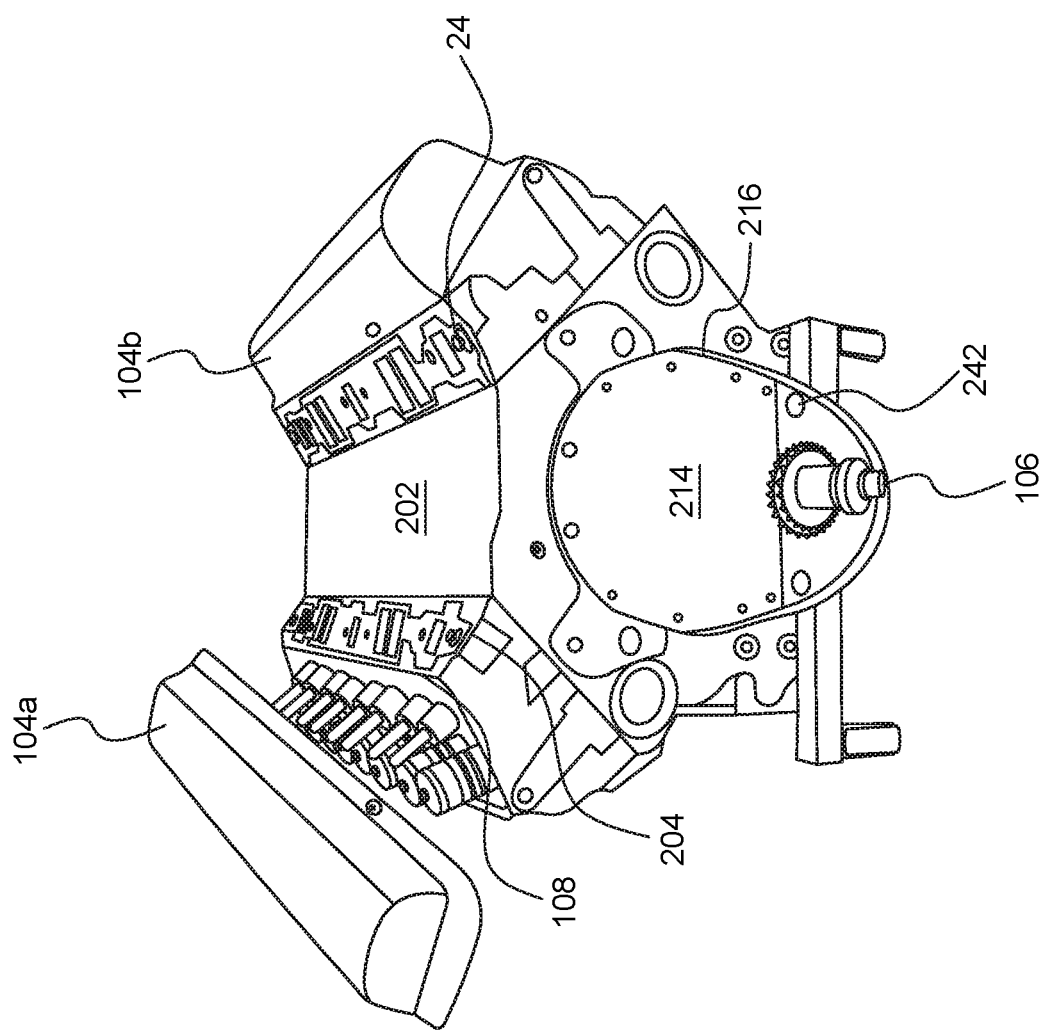
FIG. 3 illustrates a perspective view of an engine block with a piston cover removed and a first panel and a first oval panel attached over respective openings, in accordance with an embodiment of the present invention.

Looking now at FIGS. 1 and 3, the assembly 200 comprises a generally elongated first panel 202 configured to substantially match the shape of an opening formed during removal of a valve cover from an engine block 100. The first panel 202 has a generally flat disposition with various depressions, curves, and protrusions that match the contour of the valve cover. The first panel 202 substantially covers the opening formed during removal of the valve cover from the engine block 100.

It is known in the art that a valve cover is generally bolted over rocker arms in an internal combustion engine. It is also known that rocker arms are critical to having the intake and exhaust valves operate, it was necessary to keep them constantly oiled. Thus, accessing the rocker arms and covering the formed opening when the valve cover is removed can be very useful.

The first panel 202 is defined by a generally resilient first edge 204 that forms a snap-fit relationship with a valve cover perimeter. The valve cover perimeter is the portion of the engine block 100 that surrounds the opening formed when the valve cover is removed. The first edge 204 of the first panel 202 may be defined by a recessed groove that interlocks with the valve cover perimeter. The recessed groove enables a secure snap-fit interlocking engagement.

The first panel 202 is further defined by at least one first fastener aperture 206 configured to align with a valve cover aperture. At least one fastener 242 passes through the first fastener aperture 206 and the valve cover aperture for reinforcing the attachment of the first panel 202 over the formed openings in the engine block 100. The fastener 242 may include a threaded bolt.

Figure 2:
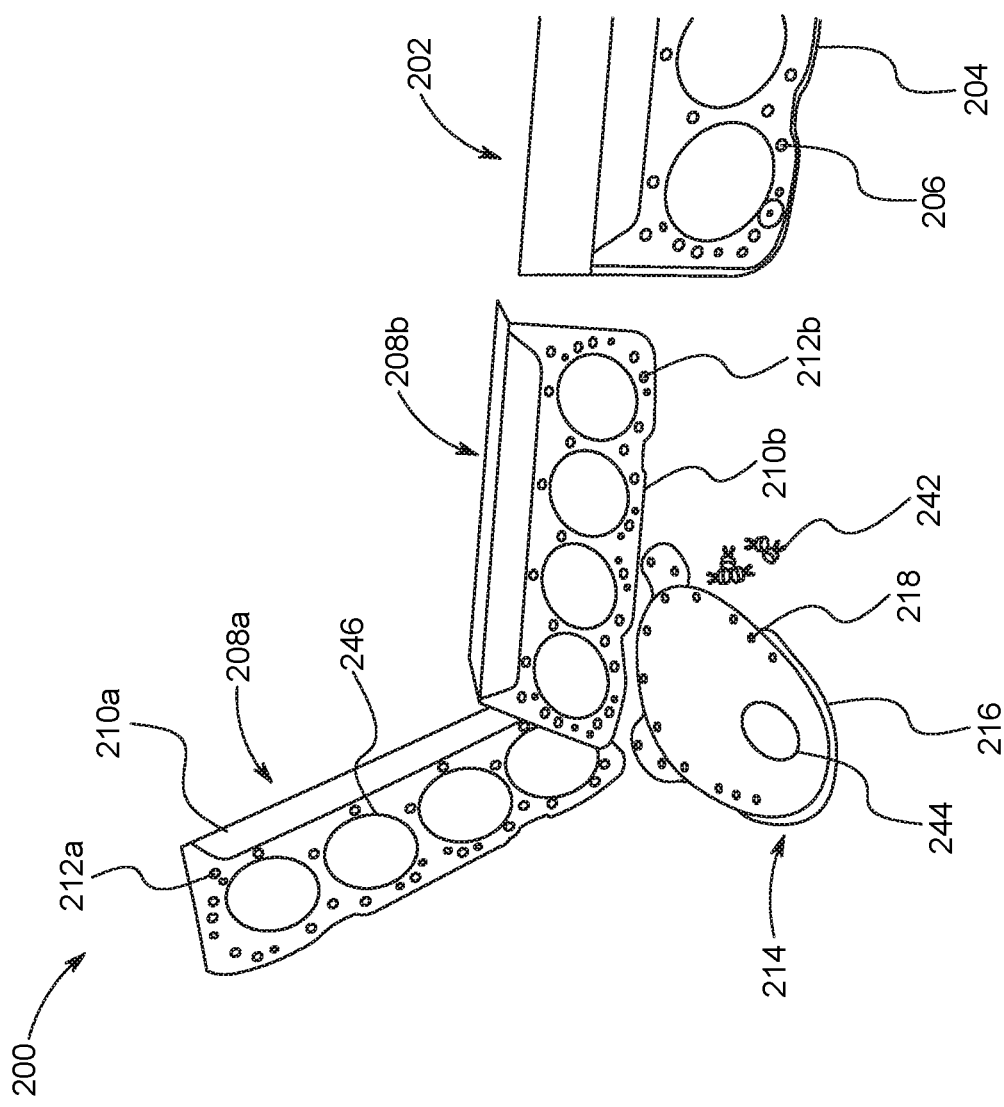
FIG. 2 illustrates a perspective view of an exemplary snap-fit engine cover assembly, in accordance with an embodiment of the present invention.
Figure 4:
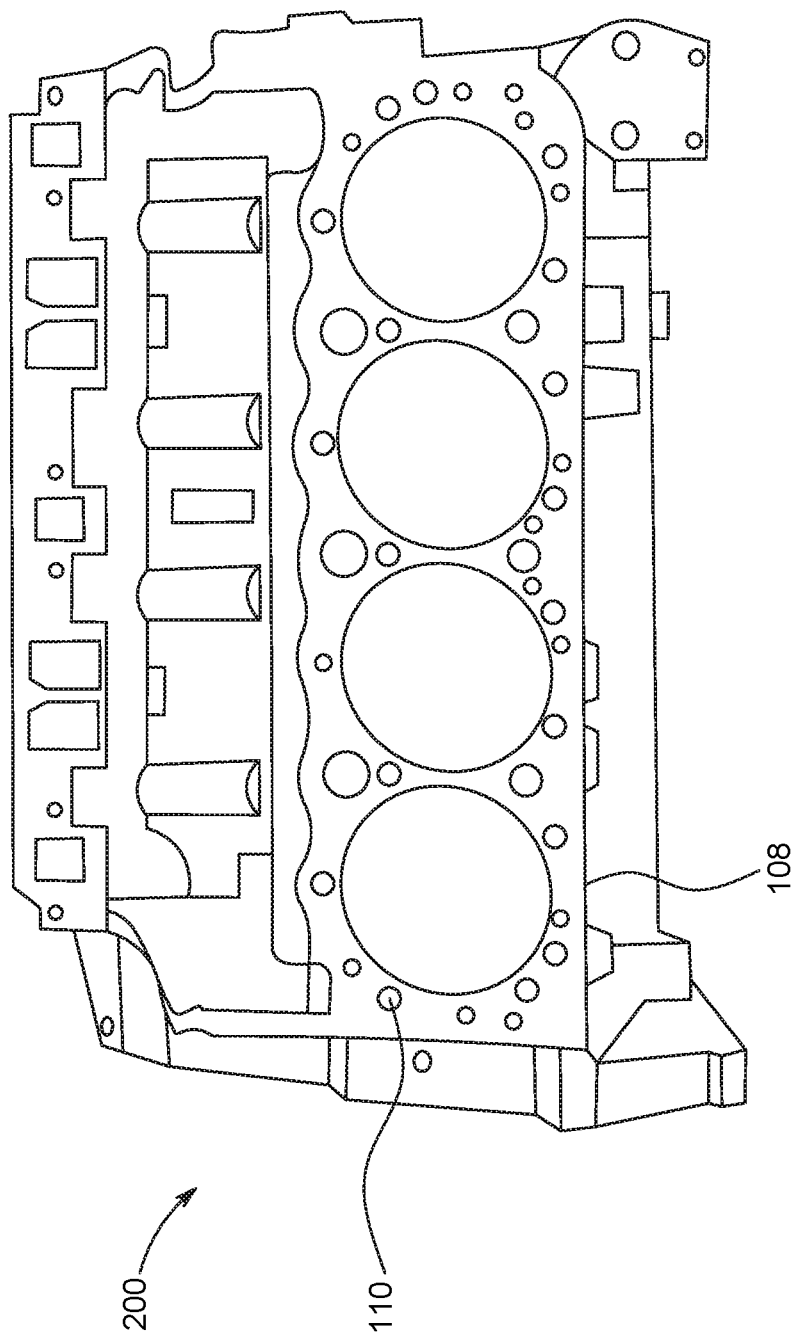
FIG. 4 illustrates a perspective view of an engine block with a piston cover removed, in accordance with an embodiment of the present invention.
Figure 5:
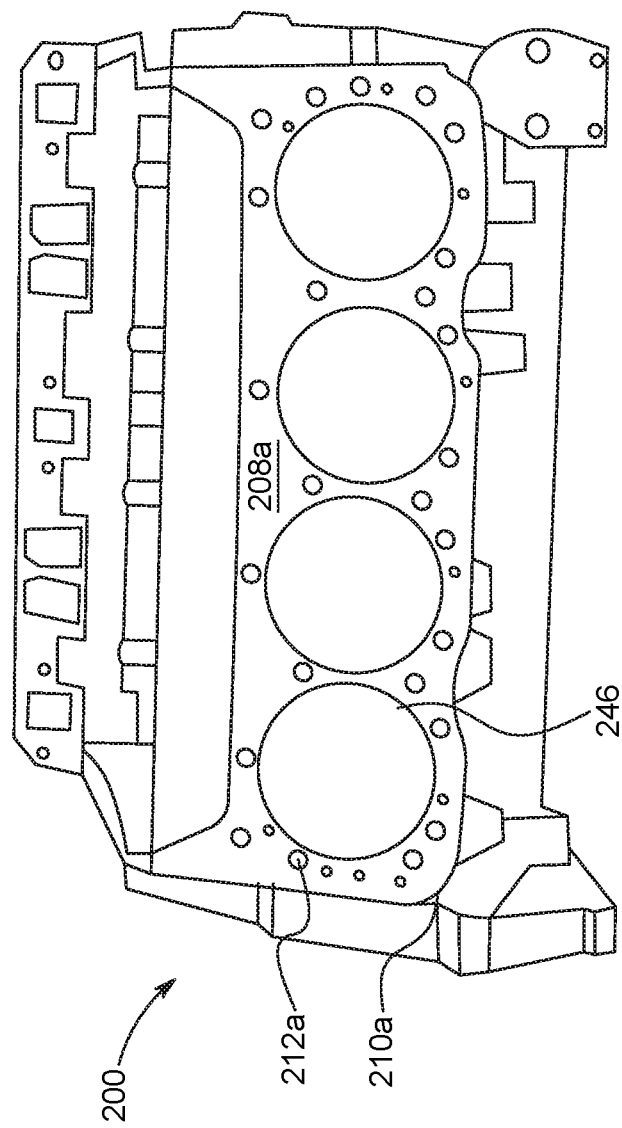
FIG. 5 illustrates a perspective view of an exemplary second panel covering an opening where the piston cover was removed, in accordance with an embodiment of the present invention.

As shown in FIGS. 2 and 5, the assembly 200 comprises a generally elongated at least one second panel 208a, 208b configured to substantially match the shape of an opening formed during removal of at least one piston cover 104a, 104b from an engine block 100. FIG. 4 illustrates the piston cover 104a, 104b removed to reveal the pistons contained therein. The piston cover 104a, 104b is generally bolted over the pistons in the combustion chamber. It is known in the art that pistons are critical to turning the crankshaft. Thus, accessing the pistons and covering the formed opening is important.

As FIG. 5 shows, the at least one second panel 208a, 208b has a generally flat disposition with various depressions, curves, and protrusions that match the contour of the piston cover 104a, 104b. The second panel 208a, 208b substantially covers the opening formed during removal of the piston cover 104a, 104b from the engine block 100. A marking 246 may made on the second panel 208a to indicate the orientation of the pistons and piston cover 104a.

The second panel 208a, 208b is defined by a generally resilient second edge 210a, 210b that forms a snap-fit relationship with a piston cover perimeter 108. The piston cover perimeter 108 is the portion of the engine block 100 that surrounds the opening formed when the piston cover 104a, 104b is removed. The second edge 210a, 210b of the second panel 208a, 208b is defined by a recessed groove that interlocks with the piston cover perimeter 108. The recessed groove enables a secure snap-fir interlocking engagement.

The second panel 208a, 208b is further defined by at least one second fastener aperture 212a, 212b configured to align with a piston cover aperture 110. At least one fastener 242 passes through the second fastener aperture 212a, 212b and the piston cover aperture 110 for reinforcing the attachment of the second panel 208a, 208b over the formed openings in the engine block 100. The fastener 242 can be a threaded bolt that tightens or loosens, depending on the fastening needs and the duration that the second panel 208a, 208b covers the opening.

Looking back at FIG. 1, a generally first oval panel 214 is configured to substantially match the shape of an opening formed during removal of a timing chain cover or a water pump jacket from the engine block 100. The first oval panel 214 substantially covers the opening formed during removal of the timing chain cover. This opening is generally forms on a side region of the engine.

It is known in the art that the timing chain runs inside the engine, as it needs to be lubricated by the engine oil. Generally timing chains rarely require maintenance, but the water pump jacket may still need to be accessed, thus forming an opening around the timing chain. Thus, accessing the timing chain and water pump jacket and covering the formed opening is important.

As FIG. 2 illustrates, the first oval panel 214 is defined by a component opening 244 that enables passage of a drive axle 106 extending from the timing chain as shown in FIGS. 1 and 3. The first oval panel 214 is further defined by a generally resilient first oval edge 216 that forms a snap-fit relationship with a timing chain cover perimeter. The timing chain cover perimeter is the portion of the engine block 100 that surrounds the opening formed when the timing chain cover is removed. The first oval edge 216 of the first oval panel 214 may be defined by a recessed groove that interlocks with the timing chain cover perimeter. The recessed groove enables a secure snap-fit interlocking engagement.

The first oval panel 214 is further defined by at least one third fastener aperture 218 configured to align with a timing cover aperture. At least one fastener 242 passes through the third fastener aperture 218 and the timing chain cover aperture for reinforcing the attachment of the first oval panel 214 over the formed openings in the engine block 100.

Figure 6:
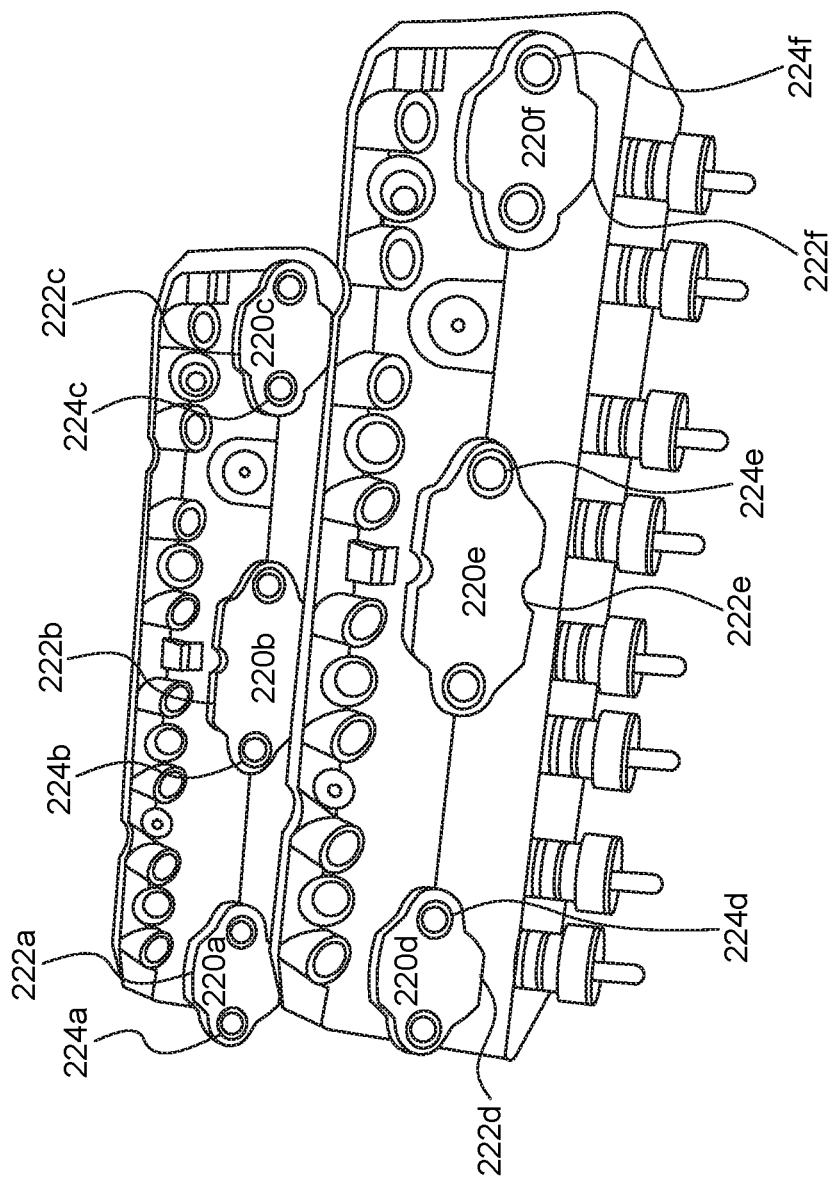
FIG. 6 illustrates a perspective view of a plurality of second oval panels covering openings where exhaust valve port covers were removed, in accordance with an embodiment of the present invention.

Turning now to FIG. 6, the assembly 200 also utilizes a plurality of generally second oval panels 220a-f that substantially match the shape of an opening formed during removal of a plurality of exhaust valve port covers from the engine block 100. The second oval panels 220a-f enable at least partial covering of the opening formed during removal of the exhaust valve port covers. In one embodiment, six second oval panels are used to cover six exhaust valve ports. Though in other embodiments, the type of engine dictates the number of second oval panels 220a-f being used.

Those skilled in the art will recognize that exhaust valves are reciprocating valves through which burned gases from a cylinder escape into the exhaust manifold. Pre-maintenance to the exhaust valves may be required to prevent carbon buildup, or to fix mechanical problems in the reciprocating motion. Thus, accessing the exhaust valves and exhaust valve ports, and then covering the formed opening is important.

The second oval panels 220a-f are defined by a generally resilient second oval edge 222a-f that forms a snap-fit relationship with an exhaust valve port perimeter. The exhaust valve port perimeter is the portion of the engine block 100 that surrounds the opening formed when the exhaust valve port cover is removed. The second oval panels 220a-f are further defined by at least one fourth fastener aperture 224a-f configured to align with an exhaust valve port cover aperture. At least one fastener passes through the fourth fastener aperture 224a-f and the exhaust valve port cover aperture for reinforcing the attachment of the second oval panels 220a-f over the formed openings in the engine block 100.

Figure 7:
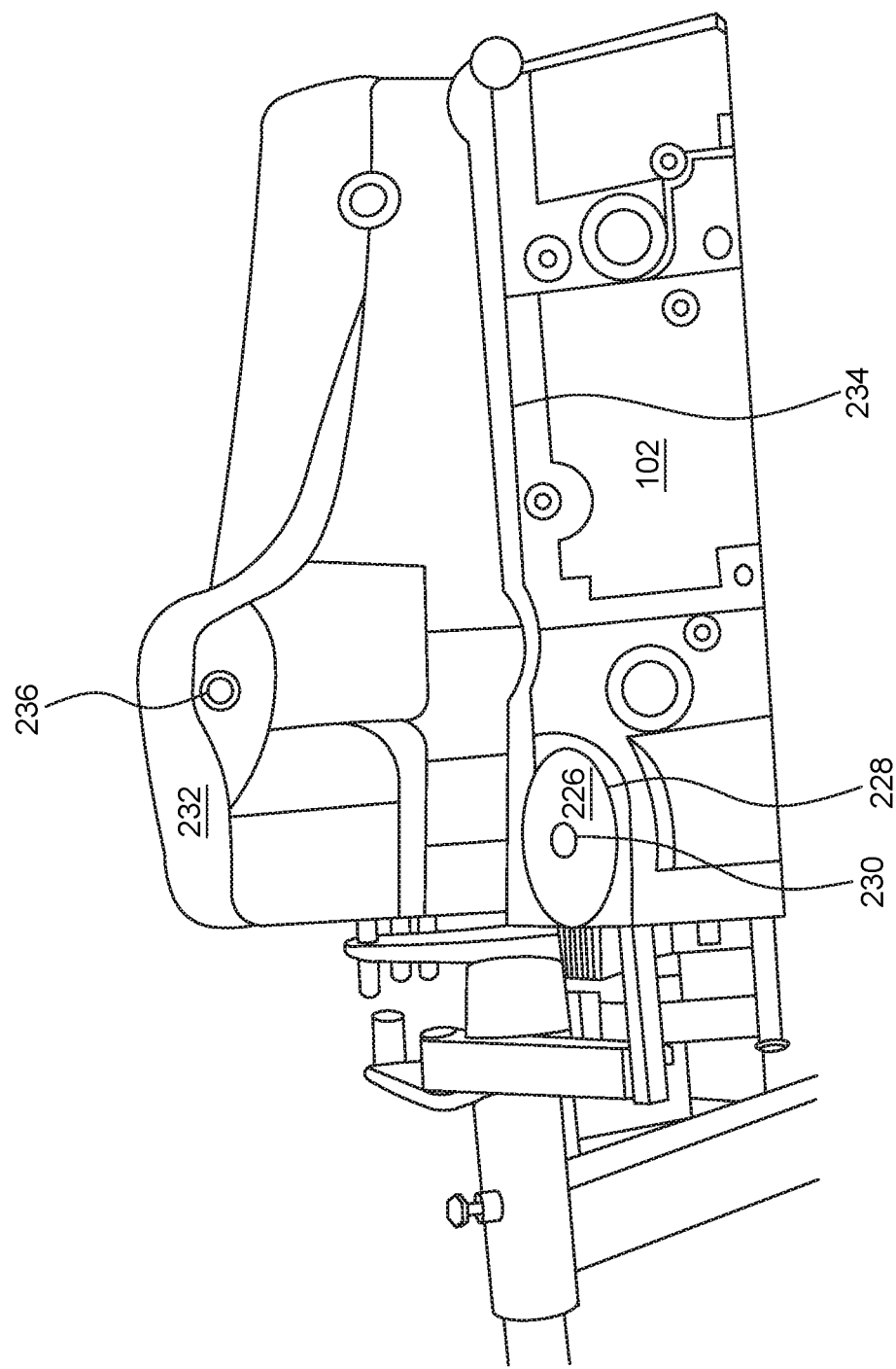
FIG. 7 illustrates a perspective view of a circular panel covering an opening where an oil filter was removed, and a curved panel covering an opening where an oil pan was removed, in accordance with an embodiment of the present invention.

As FIG. 7 illustrates, a generally circular panel 226 substantially matches the shape of an opening formed during removal of an oil filter from the engine block 100. The circular panel 226 covers the opening formed during removal of the oil filter. Those skilled in the art will recognize that the oil filter is a filter designed to remove contaminants from engine oil. The oil filter needs to be periodically changed when the oil is changed. When removed, the oil filter leaves an opening that leads to the crankshaft and interior workings of the engine block 100. Thus, accessing the exhaust valves and exhaust valve ports, and then covering the formed opening is important.

The circular panel 226 is defined by a generally resilient circular edge 228 that forms a snap-fit relationship with an oil filter perimeter. The oil filter perimeter is the portion of the engine block 100 that surrounds the opening formed when the oil filter is removed. The circular edge 228 of the circular panel 226 is defined by a recessed groove that interlocks with the oil filter perimeter. The recessed groove enables a secure snap-fit interlocking engagement.

The circular panel 226 is further defined by at least one fifth fastener aperture 230 configured to align with an oil filter aperture. At least one fastener 242 passes through the fifth fastener aperture 230 and the oil filter aperture for reinforcing the attachment of the circular panel 226 over the formed opening in the engine block 100. The fastener 242 can be a push fit fastener or a threaded bolt that tightens or loosens, depending on the fastening needs and the duration that the circular panel 226 covers the opening left from removal of the oil filter.

Looking again at FIG. 7, the assembly 200 also comprises a generally curved panel 232 that is configured to substantially match the shape of an opening formed during removal of an oil pan from the engine block 100. The curved panel 232 may have a large hump that matches the shape of an oil pan. The curved panel 232 covers the opening formed in the engine block 100 during removal of the oil pan.

Those skilled in the art will recognize that the oil pan is a detachable mechanism made out of thin steel and bolted to the bottom of the crankcase. Periodically, the oil must be changed, and the oil pan is drained and refilled to remove the older oil. To maximize its function, the oil pan is molded into a deeper section and mounted at the bottom of the crankcase to serve as an oil reservoir. When removed, the oil pan leaves an opening that leads to the crankshaft of the engine block 100. Thus, accessing the crankshaft by removing the oil pan and then covering the formed opening with the curved panel 232 is important.

The curved panel 232 is defined by a generally resilient circular edge 228 that forms a snap-fit relationship with an oil pan perimeter. The oil pan perimeter is the portion of the engine block 100 that surrounds the opening formed when the oil pan is removed. The curved panel 232 is further defined by at least one sixth fastener aperture 236 configured to align with an oil pan aperture. At least one fastener 242 passes through the sixth fastener aperture 236 and the oil pan aperture for reinforcing the attachment of the curved panel 232 over the formed opening in the engine block 100.

Figure 8:
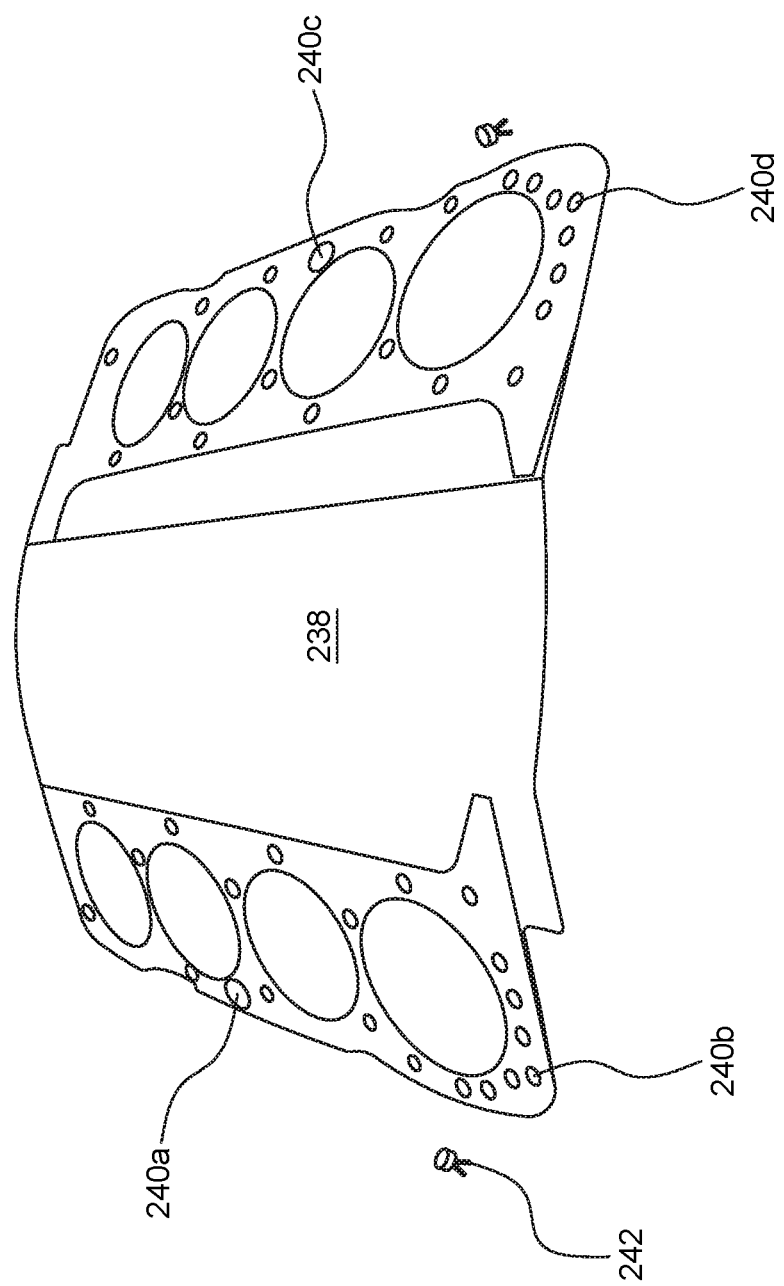
FIG. 8 illustrates a perspective view of an exemplary rectangular panel, in accordance with an embodiment of the present invention.

As FIG. 8 shows, the assembly 200 also protects the sidewall 102 of the engine block 100 with a generally rectangular panel 238. The rectangular panel 238 is configured to selectively block paint from engaging the sidewall 102 of the engine block 100 during a painting operation. The rectangular panel 238 is defined by at least one seventh fastener aperture 240*a*, 240*b*, 240*c*, 240*d* configured to align with a sidewall aperture. The fastener 242 can be push fit fastener or a threaded bolt that tightens or loosens through the seventh fastener aperture 240*a*, 240*b*, 240*c*, 240*d*, depending on the fastening needs and the duration of the painting operation.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A snap-fit engine cover assembly, the assembly comprising:
    a first panel configured to enable at least partial covering of an opening formed during removal of a valve cover from an engine block, wherein the first panel forms a snap-fit relationship with a valve cover perimeter;
    at least one second panel configured to enable at least partial covering of the opening formed during removal of an at least one piston cover, wherein the at least one second panel forms a snap-fit relationship with a piston cover perimeter;
    a third panel configured to enable at least partial covering of the opening formed during removal of a timing chain cover, wherein the third panel forms a snap-fit relationship with a timing chain cover perimeter;
    a plurality of fourth panels configured to enable at least partial covering of the opening formed during removal of a plurality of exhaust valve port covers, wherein each of the plurality of fourth panels forms a snap-fit relationship with an exhaust valve port cover perimeter;
    a fifth panel configured to enable at least partial covering of the opening formed during removal of an oil filter, wherein the fifth panel forms a snap-fit relationship with an oil filter perimeter;
    a sixth panel configured to enable at least partial covering of the opening formed during removal of the oil pan, wherein the sixth panel forms a snap-fit relationship with an oil pan perimeter; and
    a seventh panel configured to enable at least partial covering of a sidewall of the engine block, wherein the seventh panel forms a snap-fit alignment with the sidewall of the engine block;
    wherein the first panel, the at least one second panel, the third panel, the plurality of fourth panels, the fifth panel, the sixth panel, and the seventh panel have resilient edges with recessed grooves which interlock with a perimeter of the engine block.

2. The assembly of claim 1, wherein the first panel is a substantially elongated panel configured to substantially match the shape of the opening formed during removal of the valve cover from the engine block.

3. The assembly of claim 1, wherein the at least one second panel is a substantially elongated panel configured to substantially match the shape of the opening formed during removal of the at least one piston cover from the engine block.

4. The assembly of claim 1, wherein the third panel is a substantially oval panel configured to substantially match the shape of the opening formed during removal of the timing chain cover from the engine block.

5. The assembly of claim 1, wherein the plurality of fourth panels are substantially oval panels configured to substantially match the shape of the openings formed during removal of the plurality of exhaust valve port covers from the engine block.

6. The assembly of claim 1, wherein the fifth panel is a substantially circular panel configured to substantially match the shape of the opening formed during removal of the oil filter from the engine block.

7. The assembly of claim 1, wherein the sixth panel is a curved panel configured to substantially match the shape of the opening formed during removal of the oil pan from the engine block.

8. The assembly of claim 1, wherein the seventh panel is a substantially rectangular panel constructed from cardboard.

9. The assembly of claim 1, wherein the first panel, the at least one second panel, the third panel, the plurality of fourth panels, the fifth panel, and the sixth panel are fabricated from a lightweight polymer.

10. The assembly of claim 1, wherein the first panel, the second panel, the third panel, the plurality of fourth panels, the fifth panel, the sixth panel, and the seventh panel comprise at least one fastener aperture on the panels, thereby allowing at least one push fit fastener to pass through a fastener apertures on each of the panels.

11. The assembly of claim 1, wherein the third panel has a component opening, which is configured to enable passage of a drive axle.

12. A snap-fit engine cover assembly, the assembly comprising:
    a generally elongated first panel configured to substantially match a shape of an opening formed during removal of a valve cover from an engine block, the first panel further configured to enable at least partial covering of the opening formed during removal of the valve cover, the first panel defined by a generally resilient first edge that forms a snap-fit relationship with a valve cover perimeter, the first panel further defined by at least one first fastener aperture configured to align with a valve cover aperture;
    at least one generally elongated second panel configured to substantially match the shape of an opening formed during removal of at least one piston cover from the engine block, the at least one second panel further configured to enable at least partial covering of the opening formed during removal of the at least one piston cover, the at least one second panel defined by a generally resilient second edge that forms a snap-fit relationship with a piston cover perimeter, the second panel further defined by at least one second fastener aperture configured to align with a piston cover aperture;
    a first oval panel configured to substantially match a shape of an opening formed during removal of a timing chain cover from the engine block, the first oval panel further configured to enable at least partial covering of the opening formed during removal of the timing chain cover, the first oval panel defined by a generally resilient first oval edge that forms a snap-fit relationship with a timing chain cover perimeter, the first oval panel further defined by at least one third fastener aperture configured to align with a timing chain cover aperture, the first oval panel further defined by a component opening;
    a plurality of second oval panels configured to substantially match a shape of an opening formed during removal of a plurality of exhaust valve port covers from the engine block, the plurality of second oval panels further configured to enable at least partial covering of the opening formed during removal of the plurality of exhaust valve port covers, the plurality of second oval panels defined by a generally resilient second oval edge that forms a snap-fit relationship with an exhaust valve port cover perimeter, the plurality of second oval panels further defined by at least one fourth fastener aperture configured to align with an exhaust valve port cover aperture;
    a generally circular panel configured to substantially match a shape of an opening formed during removal of an oil filter from the engine block, the circular panel further configured to enable at least partial covering of the opening formed during removal of the oil filter, the circular panel defined by a generally resilient circular edge that forms a snap-fit relationship with an oil filter perimeter, the circular panel further defined by at least one fifth fastener aperture configured to align with an oil filter aperture;
    a generally curved panel configured to substantially match a shape of an opening formed during removal of an oil pan from the engine block, the curved panel further configured to enable at least partial covering of the opening formed during removal of the oil pan, the curved panel defined by a generally resilient curved edge that forms a snap-fit relationship with an oil pan perimeter, the curved panel further defined by at least one sixth fastener aperture configured to align with an oil pan cover aperture; and
    a generally rectangular panel configured to enable at least partial covering of a sidewall of the engine block, the rectangular panel defined by at least one seventh fastener aperture configured to align with a sidewall aperture.

13. The assembly of claim 12, wherein the first panel, the second panel, the first oval panel, the plurality of second oval panels, the circular panel, and the curved panel are fabricated from a lightweight polymer.

14. The assembly of claim 12, further including at least one fastener configured to pass through the fastener apertures.

15. The assembly of claim 12, wherein the first edge, the second edge, the first oval edge, the second oval edge, the circular edge, and the curved edge have a recessed groove that interlocks with the respective perimeter of the engine block.

16. The assembly of claim 12, wherein the component opening of the first oval panel is configured to enable passage of a drive axle.

17. The assembly of claim 12, wherein the rectangular panel is constructed from cardboard.

18. The assembly of claim 12, wherein the rectangular panel is configured to selectively block paint from engaging the sidewall of the engine block.

19. The assembly of claim 12, further including a marking on the panels, the marking configured to indicate the orientation of an engine component and the respective cover.

* * * * *